Patented Mar. 16, 1948

2,438,102

UNITED STATES PATENT OFFICE 2,438,102

COLOR STABILIZATION OF VINYL HALIDE RESINS

Fred W. Cox, Cuyahoga Falls, and James M. Wallace, Jr., Akron, Ohio, assignors to Wingfoot Corporation, Akron, Ohio, a corporation of Delaware No Drawing. Application June 25, 1945, Serial No. 601,548

9 Claims. (Cl. 260—78.5)

This invention relates to the stabilization of vinyl halide resins, and particularly the vinyl halide resins which are polymers of at least 70 percent of vinyl halide, including the polymers of 100 percent vinyl halide and copolymers of vinyl halides with other polymerizable mono-olefinic compounds.

Vinyl halide resins will usually discolor when heated, for example at a temperature of 100° C. or higher, and especially in the presence of iron or iron salts. It has been discovered that the addition of a small proportion of a salicylate of magnesium or an alkaline earth metal will enable the resin to resist the discoloration effect for substantial periods of time.

The vinyl halide resins which may be stabilized in accordance with this invention include the polyvinyl halides, made by the polymerization of any compound of the group consisting of vinyl chloride, vinyl bromide, vinyl fluoride and vinyl iodide without the presence of other polymerizable mono-olefinic compounds. The invention is also useful in the prevention of discoloration upon heating in copolymers of from 70 to 100 percent of a vinyl halide with from 0 to 30 percent of another polymerizable mono-olefinic compound. Although any polymerizable mono-olefinic compound which is compatible with the vinyl halide in polymeric form, i. e., which forms copolymers therewith, may be stabilized, the invention is particularly useful in the treatment of copolymers of monomeric mixtures of vinyl halide and up to 30 percent of vinyl acetate, vinylidene chloride, styrene, the alkyl fumarates, the alkyl maleates, the alkyl chloromaleates, the alkyl chlorofumarates, the alkyl acrylates, or the alpha substituted alkyl acrylates. The copolymers which are of particular importance are those of 70 to 98 percent of vinyl halide and from 2 to 30 percent of said other mono-olefinic monomer. A preferred class of copolymers are those of 80 to 95 percent of vinyl halide and from 5 to 20 percent of the other monomer.

The stabilization against discoloration upon heating is effected by the incorporation of magnesium salicylate, calcium salicylate, barium salicylate or strontium salicylate, the calcium salicylate being preferred for reasons of economy. The quantity of the salicylate used will depend upon the conditions of heating to which the vinyl resin is to be subjected. If this temperature is not severe small amounts or even traces of the salicylate will yield a beneficial result. Although the incorporation of from 0.05 to 10 percent by weight, based on the polymer content of the resin will produce useful compositions, generally the best results are obtained by the use of from 0.5 to 5 percent of the stabilizing agent.

The stabilizing agent may be incorporated by any of several methods. It may be added to the solid resin and mixed therein by means of a roll mill or other mixing machine adapted to blend solid plastic materials. The mixing machine may be heated during the mixing operation to render the compositions more plastic. Alternatively, the stabilizing agent may be dissolved in any suitable solvent and the solution then mixed with the resin. The vinyl halide resin may be dissolved in a solvent, such as ethylene dichloride, and the stabilizing agent added to the solution and dispersed therein by means of any stirring device. If the polymers or copolymers are prepared by polymerization in an aqueous emulsion, the stabilizing agent may be added and distributed through the polymer prior to coagulation. Any other method which permits a uniform distribution of the stabilizing agent throughout the polymer may be used.

The stabilized resins may be used in the preparation of cast films or in the fabrication of molded or extruded shapes, which uses are well known to the art. The stabilized vinyl halide resins are particularly useful in the preparation of transparent or light-colored articles in which discoloration upon heating is undesirable.

Further details of the invention are set forth with respect to the following specific example.

Example

A series of several 10 gram samples of a copolymer of 90 percent vinyl chloride and 10 percent diethyl fumarate were each milled separately with 2 ml. of dibutyl sebacate. Each of these samples was blended with a 0.2 gram portion of one of the following materials: calcium salicylate, magnesium salicylate, potassium salicylate, strontium salicylate and ammonium salicylate. A six sample was used as a control for the purpose of comparison and was therefore not modified by the addition of a salicyclic acid salt. The copolymer samples were rolled separately on a laboratory-size chromium-plated roll mill for 5 minutes at 140° F. and then for 5 minutes at 212° F. The copolymers were rolled into sheets 1 mm. in thickness and specimens were cut therefrom for heat stability. The specimens were introduced into an oven heated at 135° C. and every half hour for 4 hours one of each type was withdrawn. It was found that the copolymers containing magnesium salicylate, strontium salicylate and calcium salicylate were not affected by the elevated temperature, while the copolymer containing potassium salicylate was discolored to the same extent that the control sample was discolored. The copolymer sample containing ammonium salicylate was discolored even more than the control sample.

This application is a continuation-in-part of application Serial No. 502,313, filed September 14, 1943, now abandoned.

Although the invention has been described with respect to a specific example, it is not intended that the details thereof shall be construed as limitation upon the scope of the invention except to the extent incorporated in the following claims.

We claim:

1. A vinyl halide resin capable of resisting discoloration upon heating which comprises a polymer of from 70 to 100 percent of a vinyl halide and up to 30 percent of another polymerizable mono-olefinic compound, said resin containing intimately dispersed therein from 0.05 to 10 percent by weight of the polymer content, of a compound of the group consisting of magnesium salicylate and alkaline earth metal salicylates.

2. A vinyl halide resin capable of resisting discoloration upon heating which comprises a copolymer of from 70 to 98 percent of vinyl chloride and from 2 to 30 percent of diethyl fumarate, said resin containing from 0.05 to 10 percent by weight based on the polymer content, of magnesium salicylate.

3. A vinyl halide resin capable of resisting discoloration upon heating which comprises a copolymer of from 70 to 98 percent of vinyl chloride and from 2 to 30 percent of diethyl fumarate, said resin containing from 0.05 to 10 percent by weight based on the polymer content, of an alkaline earth metal salicylate.

4. A vinyl halide resin capable of resisting discoloration upon heating which comprises a copolymer of from 80 to 95 percent of vinyl chloride and from 5 to 20 percent of diethyl fumarate, said resin containing from 0.05 to 10 percent by weight based on the polymer content, of magnesium salicylate.

5. A vinyl halide resin capable of resisting discoloration upon heating which comprises a copolymer of from 80 to 95 percent of vinyl chloride and from 5 to 20 percent of diethyl fumarate, said resin containing from 0.05 to 10 percent by weight based on the polymer content, of an alkaline earth metal salicylate.

6. A vinyl halide resin capable of resisting discoloration upon heating which comprises a copolymer of from 70 to 98 percent of vinyl chloride and from 2 to 30 percent of diethyl fumarate, said resin containing from 0.5 to 5 percent by weight based on the polymer content, of magnesium salicylate.

7. A vinyl halide resin capable of resisting discoloration upon heating which comprises a copolymer of from 70 to 98 percent of vinyl chloride and from 2 to 30 percent of diethyl fumarate, said resin containing from 0.5 to 5 percent by weight based on the polymer content, of an alkaline earth metal salicylate.

8. A vinyl halide resin capable of resisting discoloration upon heating which comprises a copolymer of from 80 to 95 percent of vinyl chloride and from 5 to 20 percent of diethyl fumarate, said resin containing from 0.5 to 5 percent by weight based on the polymer content, of magnesium salicylate.

9. A vinyl halide resin capable of resisting discoloration upon heating which comprises a copolymer of from 80 to 95 percent of vinyl chloride and from 5 to 20 percent of diethyl fumarate, said resin containing from 0.5 to 5 percent by weight based on the polymer content, of an alkaline earth metal salicylate.

FRED W. COX.
JAMES M. WALLACE, Jr.

REFERENCES CITED

The following references are of record in the file of this patent:

UNITED STATES PATENTS

| Number | Name | Date |
|---|---|---|
| 2,126,179 | Duggan | Aug. 9, 1938 |
| 2,157,068 | Carruthers et al. | May 2, 1939 |
| 2,307,157 | Quattlebaum | Jan. 5, 1943 |
| 2,364,410 | Whittaker | Dec. 5, 1944 |

OTHER REFERENCES

De Navarre: "Chemistry and Manufacture of Cosmetics," published by Van Nostrand, N. Y., 1941; pages 590–593.